(12) United States Patent
Jandrew et al.

(10) Patent No.: US 12,529,065 B2
(45) Date of Patent: Jan. 20, 2026

(54) **FLOWER COLOR AND COLOR INTENSITY ALLELE IN *ANGELONIA ANGUSTIFOLIA***

(71) Applicant: Ball Horticultural Company, West Chicago, IL (US)

(72) Inventors: Jason Jandrew, Nipomo, CA (US); Arun Sharma, Santa Maria, CA (US); Laura L. Masor, Grover Beach, CA (US); Christopher R. Barbey, St. Charles, IL (US); Shankar K. Shakya, Batavia, IL (US); Megan J. Bowman, Naperville, IL (US)

(73) Assignee: Ball Horticultural Company, West Chicago, IL (US)

( * ) Notice: Subject to any disclaimer, the term of this patent is extended or adjusted under 35 U.S.C. 154(b) by 204 days.

(21) Appl. No.: 17/847,494

(22) Filed: Jun. 23, 2022

(65) Prior Publication Data

US 2022/0411808 A1 Dec. 29, 2022

Related U.S. Application Data

(60) Provisional application No. 63/314,882, filed on Feb. 28, 2022, provisional application No. 63/251,301, filed on Oct. 1, 2021, provisional application No. 63/215,311, filed on Jun. 25, 2021.

(51) Int. Cl.
*C12N 15/82* (2006.01)
(52) U.S. Cl.
CPC ................................. *C12N 15/827* (2013.01)

(58) Field of Classification Search
None
See application file for complete search history.

(56) References Cited

U.S. PATENT DOCUMENTS

PP29,270 P2 * 5/2018 Nguyen .................. A01H 5/02
Plt./404

OTHER PUBLICATIONS

Plaschil, et al., Histogenetic variation in flowers of Angelonia Humb. et Bonpl. Journal of Applied Botany and Food Quality, 82, 41-46, 2008.
Winkel-Shirley., Flavonoid Biosynthesis. A Colorful Model for Genetics, Biochemistry, Cell Biology, and Biotechnology. Plant Physiol, 126(2):485-93, (2001).

* cited by examiner

*Primary Examiner* — Weihua Fan
(74) *Attorney, Agent, or Firm* — Dentons US LLP

(57) ABSTRACT

The invention provides *Angelonia* plants comprising a recessive amf1-1 allele that confers to the plant a desired flower color, wherein said flower color is of a higher intensity when at least two copies of said allele are present in a plant when compared to the flower color of a plant lacking said at least two alleles and methods for producing a plant produced by crossing such plants with themselves or with another plant, such as a plant of another genotype. The invention further relates to seeds and plants produced by crossing *Angelonia* plants comprising a recessive amf1-1 allele. The invention further relates to parts of such plants.

32 Claims, No Drawings

Specification includes a Sequence Listing.

FLOWER COLOR AND COLOR INTENSITY ALLELE IN *ANGELONIA ANGUSTIFOLIA*

CROSS-REFERENCE TO RELATED APPLICATIONS

This application claims the benefit of U.S. Provisional Application No. 63/215,311, filed Jun. 25, 2021, U.S. Provisional Application No. 63/251,301, filed Oct. 1, 2021, and U.S. Provisional Application No. 63/314,882, filed Feb. 28, 2022, each of which is herein incorporated by reference in its entirety.

FIELD OF THE INVENTION

The present invention relates to the field of plant breeding and, more specifically, to *Angelonia* plants comprising a recessive amf1-1 allele that confers to the plants a desired flower color, wherein said flower color is of a higher intensity when at least two copies of said allele are present in a plant when compared to the flower color of a plant lacking said at least two alleles but otherwise comprising the same genetic background, and related methods and compositions for the production thereof.

INCORPORATION OF SEQUENCE LISTING

A computer readable form of a sequence listing is filed with this application by electronic submission and is incorporated into this application by reference in its entirety. The sequence listing is contained in the file named BALL045US_ST25.txt, which is 2.05 kilobytes in size (measured in operating system MS Windows) and was created on Jun. 22, 2022.

BACKGROUND OF THE INVENTION

The goal of plant breeding is to combine various desirable traits in a single variety/hybrid. Such desirable traits may include any trait deemed beneficial by a grower and/or consumer, including desirable flower color or pattern, resistance to insects or disease and tolerance to environmental stress.

Breeding techniques take advantage of a plant's method of pollination. There are two general methods of pollination: a plant self-pollinates if pollen from one flower is transferred to the same or another flower of the same plant or plant variety. A plant cross-pollinates if pollen comes to it from a flower of a different plant variety.

Plants that have been self-pollinated and selected for type over many generations become homozygous at almost all gene loci and produce a uniform population of true breeding progeny, a homozygous plant. A cross between two such homozygous plants of different genotypes produces a uniform population of hybrid plants that are heterozygous for many gene loci. Conversely, a cross of two plants each heterozygous at a number of loci produces a population of hybrid plants that differ genetically and are not uniform. The resulting non-uniformity makes performance unpredictable.

*Angelonia*, a genus of the family Plantaginaceae (formerly Scrophulariaceae), is a long summer blooming herbaceous perennial having ornamental value in mass and border plantings and as container plants. The typically low maintenance cultivars have good tolerance for summer heat and humidity and can tolerate some dry soils. The native range includes Mexico, West Indies, and South America. The species of current *Angelonia* cultivars is unclear but is typically identified as *Angelonia angustifolia*. It has been hypothesized that current *Angelonia* cultivars are hybrids of the species *Angelonia angustifolia* Benth. and *Angelonia salicariifolia* Humb. et Bonpl. (Plaschil and Olbricht, 2008).

The common name of summer snapdragon is based on the resemblance of the two-lipped small flowers to that of snapdragon. The zygomorphic flowers are arranged in racemose clusters and are known to have colors including deep mauve to violet blue, white, pink, and bicolor.

SUMMARY OF THE INVENTION

In one aspect, the invention provides an *Angelonia angustifolia* plant comprising a recessive amf1-1 allele that confers to the plant a desired flower color, wherein said flower color is of a higher intensity when at least two copies of said allele are present in a plant when compared to the flower color of a plant lacking said at least two alleles but otherwise comprising the same genetic background, wherein a representative deposit of seed comprising said allele has been deposited under NCMA Accession No. 202107001. In one embodiment, the plant is a diploid plant. In another embodiment, the plant is a tetraploid plant. In yet a further embodiment, the plant is a triploid plant. In one embodiment, the plant is hybrid. In another embodiment, the plant is inbred. In still further embodiments, the plant may comprise a transgene or a single locus conversion. In still further embodiments, the invention provides a plant part comprising a cell of such a plant, such as a cutting, leaf, a floret, an ovule, pollen, or a flower. In another embodiment, the invention provides a seed that produces such a plant. In still other embodiments, the invention provides a tissue culture of regenerable cells of such a plant, for example a tissue culture comprising cells or protoplasts from a plant part selected from the group consisting of embryos, meristems, cotyledons, pollen, leaves, anthers, roots, root tips, pistil, flower, florets, seed, stems, and protoplasts or callus derived therefrom. In a still further embodiment, the invention provides a plant regenerated from such a tissue culture, wherein the regenerated plant comprises the amf1-1 allele. In yet a further embodiment, the invention provides an $F_1$ hybrid seed having as one parent an *Angelonia angustifolia* plant comprising a recessive amf1-1 allele that confers to the plant a desired flower color, wherein said flower color is of a higher intensity when at least two copies of said allele are present in a plant when compared to the flower color of a plant lacking said at least two alleles but otherwise comprising the same genetic background. In still a further embodiment, said plant is a male parent or a female parent. In an even further embodiment, plants grown from said seed and plant parts from plant grown from said seed are provided. In yet a further embodiment, the plant is a diploid plant and said flower color increases in pigmentation over time in a flower of said plant due to the homozygous state of said allele in the plant. In an embodiment, the plant comprises a marker locus selected from the group consisting of marker locus SNP 11 (SEQ ID NO:1), marker locus SNP 27 (SEQ ID NO:4), and marker locus SNP 6 (SEQ ID NO:7).

In another aspect, the invention provides a method of introducing a desired trait into a plant comprising: (a) crossing an *Angelonia angustifolia* plant comprising a recessive amf1-1 allele that confers to the plant a desired flower color, wherein said flower color is of a higher intensity when at least two copies of said allele are present in a plant when compared to the flower color of a plant lacking said at least two alleles but otherwise comprising the same genetic background with a second plant that comprises a desired trait to produce $F_1$ progeny; (b) selecting an $F_1$ progeny that comprises the desired trait; (c) crossing the selected $F_1$ progeny with a plant of the same variety as said *Angelonia angustifolia* plant comprising a recessive amf1-1 allele that confers to the plant a desired flower color, wherein said flower color is of a higher intensity when at least two copies of said allele are present in a plant when compared to the flower color of a plant lacking said at least two alleles but otherwise comprising the same genetic background to produce backcross progeny; and (d) repeating steps (c) and (d) three or more times in succession to produce selected fourth or higher backcross progeny that comprise the desired trait. In one embodiment, the invention provides a plant produced by such a method, wherein the plant comprises said recessive amf1-1 allele. In a further embodiment, the invention provides a method of producing a plant comprising an added desired trait, the method comprising introducing a transgene or single locus conversion conferring the desired trait into an *Angelonia angustifolia* plant comprising a recessive amf1-1 allele that confers to the plant a desired flower color, wherein said flower color is of a higher intensity when at least two copies of said allele are present in a plant when compared to the flower color of a plant lacking said at least two alleles but otherwise comprising the same genetic background, wherein a representative deposit of seed comprising said allele has been deposited under NCMA Accession No. 202107001.

In another aspect, the invention provides a method for producing *Angelonia* seed comprising the steps of: (a) an *Angelonia angustifolia* plant comprising a recessive amf1-1 allele that confers to the plant a desired flower color, wherein said flower color is of a higher intensity when at least two copies of said allele are present in a plant when compared to the flower color of a plant lacking said at least two alleles but otherwise comprising the same genetic background with itself or a second plant capable of being crossed thereto; and (b) collecting resulting seed. In one embodiment, the method further comprises the steps of: (c) crossing a plant grown from said seed of step (b) with itself or a different plant at least one additional time to yield additional seed. In another embodiment, the plant is a plant of *Angelonia angustifolia* line 370-1, a sample of seed of said *Angelonia* line having been deposited under NCMA Accession No. 202107001.

In another aspect, the invention provides a method of producing an *Angelonia angustifolia* plant comprising a recessive amf1-1 allele that confers to the plant a desired flower color, wherein said flower color is of a higher intensity when at least two copies of said allele are present in a plant when compared to the flower color of a plant lacking said at least two alleles but otherwise comprising the same genetic background, said method comprising introgressing into said plant at least a first amf1-1 allele. In one embodiment said introgressing comprises: a) crossing an *Angelonia angustifolia* plant comprising a recessive amf1-1 allele that confers to the plant a desired flower color, wherein said flower color is of a higher intensity when at least two copies of said allele are present in a plant when compared to the flower color of a plant lacking said at least two alleles but otherwise comprising the same genetic background with a second *Angelonia angustifolia* plant of a different genotype to produce at least a first progeny plant; and b) selecting a progeny plant comprising said at least first amf1-1 allele. In a further embodiment, selecting a progeny plant comprises detecting a marker locus genetically linked to said amf1-1 allele selected from the group consisting of marker locus SNP 11 (SEQ ID NO:1), marker locus SNP 27 (SEQ ID NO:4), and marker locus SNP 6 (SEQ ID NO:7). In another embodiment, said amf1-1 allele has been inherited from *Angelonia angustifolia* line 370-1 or a progeny of any generation thereof comprising said allele, a sample of seed comprising the allele having been deposited under NCMA Accession No. 202107001.

DETAILED DESCRIPTION OF THE INVENTION

The invention provides *Angelonia* plants comprising a recessive amf1-1 allele that confers to the plant a desired flower color, wherein said flower color increases in pigmentation over time in a flower of said plant when the plant is homozygous for said allele. The characteristic that the color of the flowers increases in pigmentation over time and the flower colors conferred by said allele are novel and are not found in other varieties of *Angelonia*, thus resulting in *Angelonia* plants with flowers having unique flower colors and previously unobserved color intensity/duration. Some examples of the flower colors observed in plants homozygous for this allele are, but not limited to, shades of red and burgundy, and black. Through breeding of inbred plants containing the novel allele with plants of different genetic backgrounds and flower colors, the inventors were able to produce new *Angelonia* varieties having flowers that are of novel colors and, surprisingly, intensify (as opposed to fade) in color over time. As the trait described herein is believed to be conferred by a single recessive locus, homozygous deployment of the allele is needed to observe the novel flower colors and the increase in pigmentation of these flowers over time. Plants that are homozygous for the amf1-1 allele are phenotypically distinguishable from those that do not comprise the allele from visual inspection of the flowering plants as a whole. Specifically, a gradation of flower color can be observed in a single plant that is homozygous for the amf1-1 allele as plants generally contain flowers of different ages. In such a plant, the darkest flowers, which are the oldest, are at the bottom and flower color decreasing in relative intensity can be followed upwards, with the flowers at the top of the plant, which are the youngest, being the least intense on the plant. Chemical analysis of flowers obtained from such plants, revealed that the concentration of total anthocyanins increased as the flowers aged on the raceme. Thus, the increase in pigmentation observed in the flowers is due to an accumulation of anthocyanins in the petals as the flowers mature.

Anthocyanins are water soluble vacuolar pigments found throughout the tissues of vascular plants that confer orange, red, purple, and blue colors to the plant parts in which they accumulate. These compounds play key roles in the recruitment of pollinators and seed dispersers, signaling between plants and microbes, defense as antimicrobial agents, and UV protection (Winkel-Sirley, *Plant Physiology* 126:485-493, 2001). Anthocyanins are derived from anthocyanidins, the aglycone form, by adding sugars to form glycosides and acyl glycosides. Cyanidin, delphinidin, pelargonidin, peonidin, malvidin, and petunidin are the most common anthocyanidins in plants. A prior study of *Angelonia* flower color has shown malvidin is the basic pigment in petals of blue and violet colored flowers and pelargonidin is the basic pigment in petals of pink colored flowers. Both white and colored flowers were shown to have the flavonols kaempferol and quercetin as well as the flavone apigenin (Plaschil and Olbricht, 2008). Methods of assaying for anthocyanin levels and content are known in the art.

A. BREEDING *ANGELONIA* PLANTS COMPRISING A AMF1-1 ALLELE

The development of new varieties using one or more starting varieties is well known in the art and encompassed by the invention. In accordance with the invention, novel varieties may be created by crossing a plant of the invention followed by multiple generations of breeding according to such well-known methods. New varieties may be created by crossing with any second plant.

In selecting a second plant to cross with a plant of the invention, it will typically be preferred to choose those plants which either themselves exhibit one or more selected desirable characteristics or which exhibit the desired characteristic(s) when in hybrid combination. Once initial crosses have been made, selection takes place to produce new varieties. Examples of desirable traits may include, in specific embodiments, flower color or size, color patterning, foliage quality, floret size, shape and uniformity, maturity date, flower yield, seed germination rate, seedling vigor, disease tolerance or resistance, and adaptability for soil and climate conditions. Consumer-driven traits are other traits that may be incorporated into new plants developed by this invention.

One aspect of the current invention therefore provides methods for producing a plant with a desired flower color, wherein said flower color increases in darkness over time. In certain embodiments, such a method may comprise: (a) crossing an *Angelonia angustifolia* comprising a recessive amf1-1 allele that confers to the plant a desired flower color, wherein said flower color increases in pigmentation over time in a flower of said plant when the plant is homozygous for said allele with a second plant that comprise at least a first desired trait to produce $F_1$ progeny; (b) selecting an $F_1$ progeny that comprises the allele and desired trait(s); (c) crossing the selected $F_1$ progeny with itself or another *Angelonia angustifolia* plant; and (d) repeating steps (c) and (d) three or more times in succession to produce selected fourth or higher generation progeny that comprise the desired flower color, wherein said flower color increases in pigmentation over time in a flower of said progeny when the progeny is homozygous for said allele and one or more desired trait(s). In a particular embodiment, the second plant may be a *Angelonia angustifolia* plant and the progeny seed may be planted and grown to produce fertile hybrid progeny plants. A plant in accordance with the invention may be used in such crosses as the female plant or the male plant.

The invention also provides methods of producing *Angelonia* comprising (a) crossing a *Angelonia angustifolia* plant comprising a recessive amf1-1 allele as described herein with itself or a second plant capable of being crossed thereto; and (b) collecting resulting seed. In some embodiments, the methods of the present invention may further comprise the step of (c) crossing a plant grown from said seed of step (b) with itself or a second plant at least one or more additional time(s) to yield additional seed. In another embodiment, the second plant may be a plant of *Angelonia angustifolia* line 370-1. Plants, seeds, and plant parts produced from the methods described herein and which comprise an amf1-1 allele as described herein are also provided.

In certain embodiments, hybrid seeds may be produced using the methods of the present invention. A parent plant of such a seed may be a *Angelonia angustifolia* plant comprising a recessive amf1-1 allele that confers to the plant a desired flower color, wherein said flower color increases in pigmentation over time in a flower of said plant when the plant is homozygous for said allele. In other embodiments, a plant as described herein may be either the male plant or the female plant in a given cross.

In certain other embodiments, a plant of the invention may be an inbred plant, or may be a hybrid plant. In addition, a plant of the present invention may be homozygous for a recessive amf1-1 allele that confers to the plant a desired flower color, wherein said flower color increases in pigmentation over time in a flower of said plant when the plant is homozygous for said allele or a plant of the invention may be heterozygous for the allele.

In certain embodiments, the present invention provides plants modified using the methods described herein to include at least a first desired heritable trait. Such plants may, in one embodiment, be developed by backcrossing, wherein essentially all of the desired morphological and physiological characteristics of a variety are recovered in addition to a genetic locus transferred into the plant via the backcrossing technique. The term single locus converted plant as used herein refers to those plants which are developed by backcrossing, wherein essentially all of the desired morphological and physiological characteristics of a variety are recovered in addition to the single locus transferred into the variety via the backcrossing technique. By essentially all of the desired morphological and physiological characteristics, it is meant that the characteristics of a plant are recovered that are otherwise present when compared in the same environment, other than an occasional variant trait that might arise during backcrossing or direct introduction of a transgene.

Backcrossing can be used to improve a variety, and may be used, for example, to introduce a recessive amf1-1 allele into the plant genetic background of any plant that is sexually compatible with *Angelonia angustifolia*, as well as to introduce one or more traits into a plant of the invention. Backcrossing transfers a specific desired trait from one inbred or non-inbred source to a variety that lacks that trait. This can be accomplished, for example, by first crossing a variety of a desired genetic background (recurrent parent) to a donor inbred (non-recurrent parent), which carries the appropriate allele or loci for the desired trait(s) in question. The progeny of this cross are then mated back to the recurrent parent, followed by selection in the resultant progeny for the desired trait to be transferred from the non-recurrent parent. The process is repeated, for example for five or more backcross generations with selection for the desired trait, until a plant is obtained wherein essentially all of the desired morphological and physiological characteristics of the recurrent parent are recovered in the converted plant, in addition to the single transferred locus from the nonrecurrent parent. The progeny thus have the characteristic being transferred, but are like the superior parent for most or almost all other loci. The last backcross generation can be selfed to give true-breeding progeny when the trait being transferred is introgressed into a true-breeding variety.

The recurrent parent therefore provides the desired genetic background, while the choice of the particular non-recurrent parent will depend on the purpose of the backcross. One of the major purposes is to add some commercially desirable trait to the plant. The exact backcrossing protocol will depend on the characteristic or trait being altered and the genetic distance between the recurrent and nonrecurrent parents. Although backcrossing methods are simplified when the characteristic being transferred is a dominant allele, a recessive allele or an additive allele (between recessive and dominant) may also be transferred. In this instance it may be necessary to introduce a test of the progeny to determine if the desired characteristic has been successfully transferred.

Modified backcrossing may also be used with plants of different genetic backgrounds. This technique uses different recurrent parents during the backcrossing. Modified backcrossing may be used to replace the original recurrent parent with a variety having certain more desirable characteristics or multiple parents may be used to obtain different desirable characteristics from each.

B. FURTHER EMBODIMENTS OF THE INVENTION

In other embodiments, the invention provides methods of vegetatively propagating a *Angelonia* plant of the invention. Such a method may comprise the steps of: comprising the steps of: (a) collecting tissue capable of being propagated from said plant; (b) cultivating said tissue to obtain proliferated shoots; and (c) rooting said proliferated shoots to obtain rooted plantlets. In other embodiments, such a method may further comprise growing *Angelonia* plants from the rooted plantlets. In still further embodiments, a plant of the invention is propagated by seed, wherein a plant comprising a recessive amf1-1 allele may be used as either a female or a male parent for producing progeny seed and plants.

Also provided are methods of producing a *Angelonia* plant with an amf1-1 allele that that confers to the plant a desired flower color, wherein said flower color increases in pigmentation over time in a flower of said plant when the plant is homozygous for said allele, said method comprising introgressing the amf1-1 allele from a plant comprising such an allele into a plant of a different genotype. In certain embodiments, the amf1-1 allele may be inherited from *Angelonia* line 370-1 or a progeny of any generation thereof comprising the allele. As used herein, the term "introgressing," when used in reference to a genetic locus, refers to a genetic locus that has been introduced into a new genetic background, such as through backcrossing. Introgression of a genetic locus can be achieved through plant breeding methods and/or by molecular genetic methods. Such molecular genetic methods include, but are not limited to, various plant transformation techniques and/or methods that provide for homologous recombination, non-homologous recombination, site-specific recombination, and/or genomic modifications that provide for locus substitution or locus conversion.

Many single locus traits have been identified that are not regularly selected for in the development of a new inbred but that can be improved by backcrossing techniques. Single locus traits may or may not be transgenic; examples of these traits include, but are not limited to, resistance to bacterial, fungal, or viral disease, or herbicide or insect resistance. These comprise genes generally inherited through the nucleus.

Direct selection may be applied where the single locus acts as a dominant trait. For this selection process, the progeny of the initial cross are assayed for viral resistance and/or the presence of the corresponding gene prior to the backcrossing. Selection eliminates any plants that do not have the desired gene and resistance trait, and only those plants that have the trait are used in the subsequent backcross. This process is then repeated for all additional backcross generations.

Selection of *Angelonia* plants for breeding is not necessarily dependent on the phenotype of a plant and instead can be based on genetic investigations. For example, one can utilize a suitable genetic marker which is closely genetically linked to a trait of interest. One of these markers can be used to identify the presence or absence of a trait in the offspring of a particular cross, and can be used in selection of progeny for continued breeding. This technique is commonly referred to as marker assisted selection. Any other type of genetic marker or other assay which is able to identify the relative presence or absence of a trait of interest in a plant can also be useful for breeding purposes. Procedures for marker assisted selection are well known in the art. Such methods will be of particular utility in the case of recessive traits and variable phenotypes, or where conventional assays may be more expensive, time consuming or otherwise disadvantageous. Types of genetic markers which could be used in accordance with the invention include, but are not necessarily limited to, Simple Sequence Length Polymorphisms (SSLPs) (Williams et al., 1990), Randomly Amplified Polymorphic DNAs (RAPDs), DNA Amplification Fingerprinting (DAF), Sequence Characterized Amplified Regions (SCARs), Arbitrary Primed Polymerase Chain Reaction (AP-PCR), Amplified Fragment Length Polymorphisms (AFLPs) (EP 534 858, specifically incorporated herein by reference in its entirety), and Single Nucleotide Polymorphisms (SNPs) (Wang et al., 1998).

C. PLANTS DERIVED BY GENETIC ENGINEERING

Many useful traits that can be introduced by backcrossing, as well as directly into a plant, are those which are introduced by genetic transformation techniques. Genetic transformation may therefore be used to insert a selected transgene into a plant of the invention or may, alternatively, be used for the preparation of transgenes which can be introduced by backcrossing. Methods for the transformation of plants that are well known to those of skill in the art and applicable to many crop species include, but are not limited to, electroporation, microprojectile bombardment, *Agrobacterium*-mediated transformation and direct DNA uptake by protoplasts.

To effect transformation by electroporation, one may employ either friable tissues, such as a suspension culture of cells or embryogenic callus or alternatively one may transform immature embryos or other organized tissue directly. In this technique, one would partially degrade the cell walls of the chosen cells by exposing them to pectin-degrading enzymes (pectolyases) or mechanically wound tissues in a controlled manner.

An efficient method for delivering transforming DNA segments to plant cells is microprojectile bombardment. In this method, particles are coated with nucleic acids and delivered into cells by a propelling force. Exemplary particles include those comprised of tungsten, platinum, and preferably, gold. For the bombardment, cells in suspension are concentrated on filters or solid culture medium. Alternatively, immature embryos or other target cells may be arranged on solid culture medium. The cells to be bombarded are positioned at an appropriate distance below the macroprojectile stopping plate.

An illustrative embodiment of a method for delivering DNA into plant cells by acceleration is the Biolistics Particle Delivery System, which can be used to propel particles coated with DNA or cells through a screen, such as a stainless steel or Nytex screen, onto a surface covered with target cells. The screen disperses the particles so that they are not delivered to the recipient cells in large aggregates. It is believed that a screen intervening between the projectile apparatus and the cells to be bombarded reduces the size of projectiles aggregate and may contribute to a higher frequency of transformation by reducing the damage inflicted on the recipient cells by projectiles that are too large. Microprojectile bombardment techniques are widely applicable, and may be used to transform virtually any plant species.

*Agrobacterium*-mediated transfer is another widely applicable system for introducing gene loci into plant cells. An advantage of the technique is that DNA can be introduced into whole plant tissues, thereby bypassing the need for regeneration of an intact plant from a protoplast. Modern *Agrobacterium* transformation vectors are capable of replication in *E. coli* as well as *Agrobacterium*, allowing for convenient manipulations (Klee et al., 1985). Moreover, recent technological advances in vectors for *Agrobacterium*-mediated gene transfer have improved the arrangement of genes and restriction sites in the vectors to facilitate the construction of vectors capable of expressing various polypeptide coding genes. The vectors described have convenient multi-linker regions flanked by a promoter and a polyadenylation site for direct expression of inserted polypeptide coding genes. Additionally, *Agrobacterium* containing both armed and disarmed Ti genes can be used for transformation.

In those plant strains where *Agrobacterium*-mediated transformation is efficient, it is the method of choice because of the facile and defined nature of the gene locus transfer. The use of *Agrobacterium*-mediated plant integrating vectors to introduce DNA into plant cells is well known in the art (Fraley et al., 1985; U.S. Pat. No. 5,563,055).

Transformation of plant protoplasts also can be achieved using methods based on calcium phosphate precipitation, polyethylene glycol treatment, electroporation, and combinations of these treatments (see, e.g., Potrykus et al., 1985; Omirulleh et al., 1993; Fromm et al., 1986; Uchimiya et al., 1986; Marcotte et al., 1988). Transformation of plants and expression of foreign genetic elements is exemplified in Choi et al. (1994), and Ellul et al. (2003).

A number of promoters have utility for plant gene expression for any gene of interest including but not limited to selectable markers, scoreable markers, genes for pest tolerance, disease resistance, and any other gene of agronomic interest. Examples of constitutive promoters useful for driving gene expression in plants include, but are not limited to, the cauliflower mosaic virus (CaMV) P-35S promoter, which confers constitutive, high-level expression in most plant tissues (see, e.g., Odel et al., 1985), including monocots (see, e.g., Dekeyser et al., 1990; Terada and Shimamoto, 1990); a tandemly duplicated version of the CaMV 35S promoter, the enhanced 35S promoter (P-e35S) the nopaline synthase promoter (An et al., 1988), the octopine synthase promoter (Fromm et al., 1989); and the figwort mosaic virus (P-FMV) promoter as described in U.S. Pat. No. 5,378,619 and an enhanced version of the FMV promoter (P-eFMV) where the promoter sequence of P-FMV is duplicated in tandem, the cauliflower mosaic virus 19S promoter, a sugarcane bacilliform virus promoter, a *Commelina* yellow mottle virus promoter, and other plant DNA virus promoters known to express in plant cells.

A variety of plant gene promoters that are regulated in response to environmental, hormonal, chemical, and/or developmental signals can be used for expression of an operably linked gene in plant cells, including promoters regulated by (1) heat (Callis et al., 1988), (2) light (e.g., pea rbcS-3A promoter, Kuhlemeier et al., 1989; maize rbcS promoter, Schaffner and Sheen, 1991; or chlorophyll a/b-binding protein promoter, Simpson et al., 1985), (3) hormones, such as abscisic acid (Marcotte et al., 1989), (4) wounding (e.g., wunl, Siebertz et al., 1989); or (5) chemicals such as methyl jasmonate, salicylic acid, or Safener. It may also be advantageous to employ organ-specific promoters (e.g., Roshal et al., 1987; Schernthaner et al., 1988; Bustos et al., 1989).

Exemplary nucleic acids which may be introduced to the plants of this invention include, for example, DNA sequences or genes from another species, or even genes or sequences which originate with or are present in the same species but are incorporated into recipient cells by genetic engineering methods rather than classical reproduction or breeding techniques. However, the term "exogenous" is also intended to refer to genes that are not normally present in the cell being transformed, or perhaps simply not present in the form, structure, etc., as found in the transforming DNA segment or gene, or genes which are normally present and that one desires to express in a manner that differs from the natural expression pattern, e.g., to over-express. Thus, the term "exogenous" gene or DNA is intended to refer to any gene or DNA segment that is introduced into a recipient cell, regardless of whether a similar gene may already be present in such a cell. The type of DNA included in the exogenous DNA can include DNA which is already present in the plant cell, DNA from another plant, DNA from a different organism, or a DNA generated externally, such as a DNA sequence containing an antisense message of a gene, or a DNA sequence encoding a synthetic or modified version of a gene.

Many hundreds if not thousands of different genes are known and could potentially be introduced into a plant comprising a desired flower color, wherein said flower color increases in pigmentation over time in a flower of said plant when the plant is homozygous for said allele according to the invention. Non-limiting examples of particular genes and corresponding phenotypes one may choose to introduce into a of the invention include one or more genes for insect tolerance, such as a *Bacillus thuringiensis* (B.t.) gene, pest tolerance such as genes for fungal disease control, herbicide tolerance such as genes conferring glyphosate tolerance, and genes for quality improvements such as environmental or stress tolerances, or any desirable changes in plant physiology, growth, development, morphology or plant product(s). For example, structural genes would include any gene that confers insect tolerance including but not limited to a *Bacillus* insect control protein gene as described in WO 99/31248, herein incorporated by reference in its entirety, U.S. Pat. No. 5,689,052, herein incorporated by reference in its entirety, U.S. Pat. Nos. 5,500,365 and 5,880,275, herein incorporated by reference it their entirety. In another embodiment, the structural gene can confer tolerance to the herbicide glyphosate as conferred by genes including, but not limited to *Agrobacterium* strain CP4 glyphosate resistant EPSPS gene (aroA:CP4) as described in U.S. Pat. No. 5,633,435, herein incorporated by reference in its entirety, or glyphosate oxidoreductase gene (GOX) as described in U.S. Pat. No. 5,463,175, herein incorporated by reference in its entirety.

Alternatively, the DNA coding sequences can affect these phenotypes by encoding a non-translatable RNA molecule that causes the targeted inhibition of expression of an endogenous gene, for example via antisense- or cosuppression-mediated mechanisms (see, for example, Bird et al., 1991). The RNA could also be a catalytic RNA molecule (i.e., a ribozyme) engineered to cleave a desired endogenous mRNA product (see, for example, Gibson and Shillito, 1997). Thus, any gene which produces a protein or mRNA which expresses a phenotype or morphology change of interest is useful for the practice of the present invention.

D. DEFINITIONS

In the description and tables herein, a number of terms are used. In order to provide a clear and consistent understanding of the specification and claims, the following definitions are provided:

Aglycon (Aglycone): The non-sugar compound remaining after replacement of the glycosyl group from a glycoside by a hydrogen atom.

Allele: Any of one or more alternative forms of a gene locus, all of which alleles relate to one trait or characteristic. In a diploid cell or organism, the two alleles of a given gene occupy corresponding loci on a pair of homologous chromosomes.

Anthocyanidin: An extended conjugation made up of C6-C3-C6 flavonoid skeleton.

Anthocyanin: Anthocyanins are a group of plant pigments that generally occur in the plant as glycosides and acylglycosides of anthocyanidins, the aglycones. Anthocyanidins vary in the different hydroxyl or methoxyl substitutions in their basic flavylium (2-phenylbenzopyrilium) structure. In accordance with the invention, an *Angelonia* plant as described herein has a desired flower color, where the flower color is considered to be high intensity. Specifically, the *Angelonia* plants of the present invention have a flower color is of a higher intensity or more intense in a plant that has at least two copies of the amf1-1 allele compared to a plant that comprises one or no amf1-1 alleles but otherwise comprises the same genetic background. In some embodiments, plants that are homozygous for the amf1-1 allele, such as diploid the *Angelonia* plants may also have flowers where the concentration of total anthocyanins in said flowers increases as the flowers age on the raceme.

Backcrossing: A process in which a breeder repeatedly crosses hybrid progeny, for example a first generation hybrid ($F_1$), back to one of the parents of the hybrid progeny. Backcrossing can be used to introduce one or more single locus conversions from one genetic background into another.

Crossing: The mating of two parent plants.

Cross-pollination: Fertilization by the union of two gametes from different plants.

Diploid: A cell or organism having two sets of chromosomes.

Emasculate: The removal of plant male sex organs or the inactivation of the organs with a cytoplasmic or nuclear genetic factor or a chemical agent conferring male sterility.

Enzymes: Molecules which can act as catalysts in biological reactions.

$F_1$ Hybrid: The first generation progeny of the cross of two nonisogenic plants.

Genotype: The genetic constitution of a cell or organism.

Haploid: A cell or organism having one set of the two sets of chromosomes in a diploid.

Linkage: A phenomenon wherein alleles on the same chromosome tend to segregate together more often than expected by chance if their transmission was independent.

Phenotype: The detectable characteristics of a cell or organism, which characteristics are the manifestation of gene expression.

Plant Part: As used herein, a plant part refers to a part of a plant of the present invention. A plant part may be defined as comprising a cell of such plant, such as a cutting, a leaf, a floret, an ovule, pollen, a cell, a seed, a flower, an embryo, a meristem, a cotyledon, an anther, a root, a root tip, a pistil, a stalk, a stem, and a protoplast or callus derived therefrom.

Quantitative Trait Loci (QTL): Quantitative trait loci (QTL) refer to genetic loci that control to some degree numerically representable traits that are usually continuously distributed.

Regeneration: The development of a plant from tissue culture. In accordance with the invention, a regenerated *Angelonia* plant as described herein would comprise the amf1-1 allele.

Self-pollination: The transfer of pollen from the anther to the stigma of the same plant.

Single Locus Converted (Conversion) Plant: Plants which are developed by a plant breeding technique called backcrossing, wherein essentially all of the desired morphological and physiological characteristics of a *Angelonia* variety are recovered in addition to the characteristics of the single locus transferred into the variety via the backcrossing technique and/or by genetic transformation.

Substantially Equivalent: A characteristic that, when compared, does not show a statistically significant difference (e.g., $p=0.05$) from the mean.

Tetraploid: A cell or organism having four sets of chromosomes.

Tissue Culture: A composition comprising isolated cells of the same or a different type or a collection of such cells organized into parts of a plant. A tissue culture in accordance with the invention may originate from or comprise cells or protoplasts from a plant part selected from the group consisting of embryos, meristems, cotyledons, pollen, leaves, anthers, roots, root tips, pistil, flower, florets, seed, stems, and protoplasts or callus derived therefrom.

Triploid: A cell or organism having three sets of chromosomes.

E. DEPOSIT INFORMATION

A deposit of *Angelonia angustifolia* line 370-1, which contains the amf1-1 allele described herein, has been made with the Provasoli-Guillard National Center for Marine Algae and Microbiota (NCMA), 60 Bigelow Drive, East Boothbay, Maine., 04544, USA. The seeds are deposited under NCMA Accession No. 202107001. The date of the deposit is Jul. 7, 2021. Access to the deposit will be available during the pendency of the application to persons entitled thereto upon request. The deposit has been accepted under the Budapest Treaty and will be maintained in the NCMA Depository, which is a public depository, for a period of 30 years, or 5 years after the most recent request, or for the enforceable life of the patent, whichever is longer, and will be replaced if nonviable during that period. Applicant does not waive any infringement of their rights granted under this patent or any other form of variety protection, including the Plant Variety Protection Act (7 U.S.C. 2321 et seq.).

EXAMPLES

Although the foregoing invention has been described in some detail by way of illustration and example for purposes of clarity and understanding, it will be obvious that certain changes and modifications may be practiced within the scope of the invention, as limited only by the scope of the appended claims.

Example 1

Identification of *Angelonia angustifolia* Plants with Mutant Amf1-1 Allele

In 2016, three *Angelonia angustifolia* plants having a novel dark burgundy flower color with high color intensity were observed in an $F_4$ inbred population of *Angelonia angustifolia* having magenta-colored flowers. The selected plants were coded 370-1, 370-2, and 370-3. Except for these three plants, the $F_4$ population was not segregating for flower color. Each plant was self-crossed and the resultant progeny, also coded as lines 370-1, 370-2, and 370-3 respectively, yielded the same dark burgundy flower color with high color intensity. This flower color and the degree of color intensity was not previously seen in *Angelonia angustifolia* plants. Furthermore, the intensity/darkness of the flower color increased as the flowers aged. The allele associated with these phenotypes was designated amf1-1. Based on the flower color phenotype, it was originally assumed that all three plants comprised the same amf1-1 allele. Subsequent breeding with lines 370-1, 370-2, and 370-3 revealed consistent, novel flower color outcomes in the $F_2$ generations and beyond which validated this assumption.

Example 2

Introgression of the Amf1-1 Allele into *Angelonia angustifolia* Plants Having Dark Pink Flowers Yield Progeny Having True Red Colored Flowers with High Color Intensity Inbred lines having novel true red colored flowers were developed through a breeding program using the mutant plant having burgundy-colored flowers with high color intensity coded 370-1. In 2016, a cross was made between a female *Angelonia angustifolia* plant designated 370-1 having dark burgundy flowers and high color intensity and a male *Angelonia angustifolia* proprietary plant designated 227-1 having dark pink flowers. From the $F_1$ hybrid population, a single plant having cherry-colored flowers with dark spots was selected and coded 490-2. This plant was self-crossed to create an $F_2$ population. From the $F_2$ population, a plant having true red colored flowers with high color intensity was observed and coded 552-1. This true red flower color has not previously been seen in *Angelonia*. Plant 552-1 was self-crossed two more generations to yield two $F_4$ inbred lines, designated 287-1 and 290-1, wherein both lines had the novel true red colored flowers with high color intensity.

Additional inbred lines having true red colored flowers were developed through a breeding program using the *Angelonia angustifolia* plant designated 370-2, which also has dark burgundy flowers and high color intensity. In 2016, 370-2 was self-crossed and from the resulting population, a plant having burgundy flowers was selected and coded 332-1. A cross was made between a female plant coded 332-1 and two proprietary *Angelonia angustifolia* sib male plants, coded 184-(2), having dark pink flowers. From the $F_1$ hybrid population, a single plant having cherry-colored flowers was selected and coded 526-1. This plant was self-crossed to create an $F_2$ population. From the $F_2$ population, a plant having true red flowers with high color intensity was observed and coded 612-1. Plant 612-1 was self-crossed to develop two $F_3$ inbred lines having true red flowers, which were coded 302-1 and 302-3.

The four inbred lines having novel true red colored flowers with high color intensity and described above were used in crosses to develop hybrids having the true red flower color trait. A plant from the inbred line coded 287-1 was used as a female parent in a cross with a male parent plant from the inbred line coded 302-1 in a cross that yielded progeny coded 20-2156. Another cross, coded 20-2157, was made using a female plant from the inbred line coded 290-1 and a male plant from the inbred line coded 302-3. Both crosses yielded hybrid plants having the true red colored flower with high color intensity trait.

Example 3

Introgression of the Amf1-1 Allele into *Angelonia angustifolia* Plants Having Violet Flowers Yield Progeny Having Black Colored Flowers with High Color Intensity An inbred line having novel black colored flowers with high color intensity was developed through a breeding program using the *Angelonia angustifolia* plant having dark burgundy flowers and high color intensity and designated 370-3. In 2016, a cross was made between the female plant coded 370-3 and a proprietary male *Angelonia angustifolia* plant coded 471-1 having violet flowers. From the $F_1$ hybrid population a single plant having violet-colored flowers was selected and coded 493-1. This plant was self-crossed to create an $F_2$ population. From the $F_2$ population, two plants having novel black colored flowers with high color intensity were observed and coded 564-1 and 564-2. Plant 564-2 was self-crossed one more generation to yield an $F_3$ inbred population of plants from which one plant coded 406-1 having the novel black colored flowers with the high color intensity trait was selected.

Example 4

Introgression of the Amf1-1 Allele into *Angelonia angustifolia* to Develop Vegetative Plants Having Novel Flower Colors with High Color Intensity A vegetative plant coded ANG-07680-05, having an upright growth habit and novel dark red colored flowers with high color intensity, was developed through a breeding program using the plant coded 370-3. Male parent plant coded 370-3, having burgundy-colored flowers with high color intensity, was crossed with a proprietary female parent plant coded 7090-1, having purple-violet-colored flowers. From the resulting population, coded ANG-07127, one plant having an upright growth habit and dark purplish-burgundy-colored flowers was selected and coded ANG-07127-02. This plant was self-crossed and the resulting population was coded ANG-07377. From this population two plants were selected, one coded ANG-07377-01, having an upright habit and very dark red colored flowers with high color intensity, and another coded ANG-07377-02, having an upright habit and very dark purple-colored flowers with high color intensity, that become nearly black with age. ANG-07377-01 was used as the female parent in a cross with ANG-07377-02 as the male parent that yielded a population coded ANG-07680. From this population a plant having upright growth habit and a novel dark red flower color with high color intensity trait was selected and coded ANG-07680-05.

A vegetative plant coded ANG-08028-02, having a semi-upright growth habit and novel dark purple-black colored flowers with high color intensity, was developed through a breeding program using the plant coded 370-3. A male parent plant, coded 370-3, having burgundy-colored flowers with high color intensity, was crossed with a proprietary female parent plant coded LM6943-3, having an upright growth habit and magenta-burgundy colored flowers. From the resulting population, coded ANG-07180, two plants were selected, one coded ANG-07180-03, having an upright habit and magenta-colored flowers, and another coded ANG-07180-01, having an upright habit and dark pink colored flowers. ANG-07180-03 was used as the female parent in a cross with ANG-07180-01 as the male parent that yielded a population coded ANG-07321. From this population a plant having upright growth habit and novel purple-burgundy colored flower with high color intensity trait was selected and coded ANG-07321-03. A proprietary male parent plant coded ANG-07341-02, having a spreading growth habit and purple-colored flowers, was crossed with the female parent plant ANG-07321-03. From the resulting population, coded ANG-07874, a plant having a semi-upright growth habit and dark purple-colored flowers was selected and coded ANG-07874-02. Plant ANG-07874-02 was self-crossed and from the resulting populations coded 08028, a plant having a semi-upright growth habit and novel dark purple-black colored flowers with high color intensity was selected and coded ANG-08028-2. This plant was later confirmed to be a tetraploid. In view of this, tetraploid and triploid plants having novel flower colors with high color intensity are contemplated by the present invention.

Example 5

Analysis of Anthocyanin Concentration and Color Intensity Progression in Flowers of Different Ages in *Angelonia angustifolia* Plants Homozygous for the Amf1-1 Allele In addition to the novel flower color and color intensity observed in *Angelonia* plants homozygous for the amf1-1 allele, it was observed that flower color darkened as the flowers aged, which was unexpected as flower color typically fades in a plant over time. A chemical analysis of the flowers from plants comprising the amf1-1 allele in a homozygous revealed that the concentration of total anthocyanins increased as the flowers aged on the raceme. Phenotypically, mature flowers were darker in color than those of an intermediate age, which in turn were darker than the color of flowers of a young age. This phenotype was consistently observed across all diploid *Angelonia* lines that were evaluated but was observed only in a subset of tetraploid *Angelonia* lines. Therefore, there exists a gradation of flower color in a single plant that is homozygous for the amf1-1 allele. These results of the analysis are shown in Table 1 below. Color chart references provided herein are to the Pantone Color Bridge, $2^{nd}$ Edition (Pantone LLC, Carlstadt, NJ).

TABLE 1

Concentration and profile of anthocyanins at different ages of *Angelonia* flowers having novel flower colors.

| Line | Flower Color | Pantone Color Code | Flower Age | Total Anthocyanin (mg/g) | Average Total Anthocyanin (mg/g) | Relative intensity (%) | | | | | | Total flavonoids |
|---|---|---|---|---|---|---|---|---|---|---|---|---|
| | | | | | | Delphi. | (mg/g) | Petuni. | Pelargoni | Peoni. | Malvi. | |
| 552-1 | True Red | 206CP | Young | 14.15 | | 0.00 | 11.93 | 0.00 | 71.31 | 16.76 | 0.00 | 13.23 |
| 552-1 | True Red | 207CP | Intermediate | 22.24 | | 0.00 | 9.02 | 0.00 | 73.89 | 17.08 | 0.00 | 14.15 |
| 552-1 | True Red | 216CP | Mature | 27.77 | 21.39 | 0.00 | 10.87 | 0.00 | 69.05 | 20.09 | 0.00 | 17.74 |
| 343-2 | Dark Burgundy | 235C | Young | 12.24 | | 0.00 | 40.70 | 0.00 | 10.20 | 42.73 | 6.37 | 9.16 |
| 343-2 | Dark Burgundy | 690CP | Intermediate | 21.68 | | 1.56 | 9.89 | 1.25 | 13.22 | 54.20 | 19.88 | 10.77 |
| 343-2 | Dark Burgundy | 504C | Mature | 34.45 | 22.79 | 1.97 | 10.19 | 1.35 | 18.50 | 51.48 | 16.51 | 12.98 |
| 564-1 | Black | 511C | Young | 26.70 | | 23.99 | 7.92 | 15.36 | 0.79 | 6.42 | 45.53 | 11.87 |
| 564-1 | Black | 5115CP | Intermediate | 49.66 | | 24.72 | 5.89 | 14.74 | 0.41 | 6.01 | 48.23 | 17.89 |
| 564-1 | Black | 5CP | Mature | 72.14 | 49.50 | 22.32 | 3.86 | 13.58 | 0.37 | 5.38 | 54.49 | 14.80 |
| 564-2 | Black | 511C | Young | 25.45 | | 24.97 | 7.70 | 14.75 | 0.35 | 5.56 | 46.67 | 15.37 |
| 564-2 | Black | 5115CP | Intermediate | 39.70 | | 23.80 | 6.18 | 14.68 | 0.18 | 5.30 | 49.87 | 12.85 |
| 564-2 | Black | 5CP | Mature | 62.25 | 42.47 | 21.68 | 4.91 | 13.90 | 0.13 | 4.95 | 54.43 | 20.13 |

Example 6

Marker Development for the *Angelonia angustifolia* Amf1-1 Allele

To develop a DNA-based marker associated with the amf1-1 allele in *Angelonia angustifolia*, an $F_2$ mapping population was derived from an initial parental cross between the diploid *Angelonia* line designated 370-1, which has dark burgundy flowers and high color intensity, and the diploid proprietary *Angelonia* line designated 227-1, which has dark pink flowers. A progeny plant having cherry-colored flowers with dark spots was selected from the resultant $F_1$ hybrid population and designated 490-2. This plant was self-crossed to produce the $F_2$ population used for mapping. The $F_2$ population was observed to be segregating for five different flower color classes: pink, purple, magenta, burgundy, and true red. Based on a phenotypic evaluation, 77 of 342 individuals (24%) were determined to carry the amf1-1 allele. As described in Example 2 above, the amf1-1 locus behaves as a single recessive gene and is responsible for the burgundy and true red flower colors. From the $F_2$ population, all 342 full-sibs were used for genotyping via whole-genome re-sequencing using 2×150 bp short-reads on an Illumina NovaSeq 6000 platform. A 415 Mb haploid genome size was calculated from flow cytometry data, indicating 0.8-0.9 pg of DNA per diploid cell and a general equivalence of 1 pg DNA=978 Mb.

A diploid true red flower bearing *Angelonia angustifolia* genome was assembled to facilitate the analysis of $F_2$ genotyping data for genetic association. High-molecular weight genomic DNA was extracted from leaves of diploid *Angelonia* plants with true red flowers. Genomic DNA fragments were size selected to 20 kb and sequenced using the PacBio Sequel IIe platform using two SMRT cells to obtain HiFi reads at >50× genome coverage. HiFi reads were de novo assembled using the HiFiasm assembly algorithm using standard parameters to render a contig-level genome assembly. The primary assembly genome FASTA file was used as a mapping reference for the Illumina $F_2$ resequencing data using the BWA aligner with typical mapping parameters {minimum seed length=19, penalty for mismatch=4, gap open penalties for indels=6, penalty of unmapped read pair=17}. The resulting SAM file was filtered, sorted and indexed using SAMtools. SNP calling was done using BCFtools. Poor quality variants and individuals were removed using an R package vcfR. Genetic association between individuals with and without the amf1-1 allele was performed using the software PLINK.

Variants associated with amf1-1 allele were identified. To translate these in silico findings into a DNA assay, several high-resolution melting (HRM) markers were developed to rapidly assay SNPs spanning the single genetically associated region. PCR primers, having a melting temperature between 58° and 64° C., were designed to amplify a 100-180 bp DNA fragment surrounding the associated DNA mutations. The HRM primers were optimized using a LightScanner HR/96 platform (Idaho Technology, Inc.). The HRM markers are co-dominant and able to discriminate all three possible allelic states. The trait linked markers are shown in Table 2.

TABLE 2

SNP markers associated with the novel high-intensity flower color trait.

| Marker name | Genome Scaffold # | Genome Scaffold Length | Genome SNP position (bp) | Marker size (bp) | SNP position in marker (bp) | SNP change | Favorable (mutant) allele | Marker sequence (SEQ ID NO) | Fwd primer (SEQ ID NO) | Rev primer (SEQ ID NO) |
|---|---|---|---|---|---|---|---|---|---|---|
| SNP 11 | 15 | 29,166,692 | 2,777,171 | 75 | 45 | [G/A] | G | 1 | 2 | 3 |
| SNP 6 | 15 | 29,166,692 | 2,715,043 | 51 | 21 | [C/T] | C | 7 | 8 | 9 |
| SNP 27 | 15 | 29,166,692 | 2,243,058 | 99 | 59 | [G/T] | G | 4 | 5 | 6 |

Markers were validated using *Angelonia angustifolia* germplasm that were both positive and negative for the amf1-1 phenotype, including commercial cultivars in the Serena and Serenita series. In addition to plants described in the above breeding examples, four plants were selected from a proprietary breeding program. Two plants were positive for the amf1-1 phenotype and two were negative. Data for a subset of plants tested is shown in Table 3 below, however an additional 187 diploid and tetraploid *Angelonia* plants were tested and the SNPs identified to be used as markers demonstrated a 98.9% correct-call rate.

TABLE 3

Marker validation in various *Angelonia angustifolia* plants.

| Plant | Flower Color/ amf1-1 Phenotype (+/−) | SNP11 Marker Genotype | SNP 27 Marker Genotype | SNP 6 Marker Genotype |
|---|---|---|---|---|
| 552-1 | Red/+ | Mutant | Mutant | Mutant |
| 370-1 | Burgundy/+ | Mutant | Mutant | Mutant |
| 552-7 | Red/+ | Mutant | Mutant | Mutant |

TABLE 3-continued

Marker validation in various *Angelonia angustifolia* plants.

| Plant | Flower Color/ amf1-1 Phenotype (+/−) | SNP11 Marker Genotype | SNP 27 Marker Genotype | SNP 6 Marker Genotype |
|---|---|---|---|---|
| 370-3 | Burgundy/+ | Mutant | Mutant | Mutant |
| 564-2 | Black/+ | Mutant | Mutant | Mutant |
| 21-448-3 | Burgundy/+ | Mutant | Mutant | Mutant |
| 21-736-1 | Red/+ | Mutant | Mutant | Mutant |
| 21-456-2 | Magenta/− | Wild Type | Wild Type | Wild Type |
| 21-718-3 | Violet/− | Het | Het | Het |
| 20-2156 | Red/+ | Mutant | Mutant | Mutant |
| 20-2157 | Red/+ | Mutant | Mutant | Mutant |
| ANG-07680-05 | Dark Red/+ | Mutant | Mutant | Mutant |
| ANG-08028-02 | Dark Purple/+ | Mutant | Mutant | Mutant |
| Serena Rose | Rose/− | Het | Het | Het |
| Serena Purple Improved | Purple/− | Wild Type | Wild Type | Wild Type |
| Serenita Purple | Purple/− | Het | Het | Het |
| Serenita Raspberry | Raspberry/− | Wild Type | Wild Type | Wild Type |
| Serenita Rose | Rose/− | Het | Het | Het |

What is claimed is:

1. An *Angelonia angustifolia* plant comprising a recessive amf1-1 allele, wherein said plant comprises a marker locus selected from the group consisting of marker locus SNP 11 having SEQ ID NO: 1, marker locus SNP 27 having SEQ ID NO:4, and marker locus SNP 6 having SEQ ID NO:7, and wherein a representative deposit of seed comprising said allele has been deposited under NCMA Accession No. 202107001.

2. The plant of claim 1, wherein said plant is a diploid plant.

3. The plant of claim 1, wherein said plant is a tetraploid plant.

4. The plant of claim 1, wherein the plant is hybrid.

5. The plant of claim 1, wherein the plant is inbred.

6. The plant of claim 1, wherein the plant comprises a transgene.

7. The plant of claim 1, wherein the plant comprises a single locus conversion.

8. A plant part comprising a cell of the plant of claim 1.

9. The plant part of claim 8, further defined as a cutting, leaf, a floret, an ovule, pollen, or a flower.

10. A seed that produces the plant of claim 1.

11. A tissue culture of regenerable cells of the plant of claim 1.

12. The tissue culture according to claim 11, comprising cells or protoplasts from a plant part selected from the group consisting of embryos, meristems, cotyledons, pollen, leaves, anthers, roots, root tips, pistil, flower, florets, seed, stems, and protoplasts or callus derived therefrom.

13. A plant regenerated from the tissue culture of claim 11, wherein the regenerated plant comprises the amf1-1 allele.

14. A method of introducing a desired trait into a plant comprising:
  (a) crossing a plant according to claim 1 with a second plant that comprises a desired trait to produce $F_1$ progeny;
  (b) selecting an $F_1$ progeny that comprises the desired trait and said allele;
  (c) crossing the selected $F_1$ progeny with a plant of the same variety as said plant according to claim 1 to produce backcross progeny; and
  (d) repeating steps (c) and (d) three or more times in succession to produce selected fourth or higher backcross progeny that comprise the desired trait and said allele.

15. A plant produced by the method of claim 14.

16. A method of producing a plant comprising an added desired trait, the method comprising introducing a transgene or single locus conversion conferring the desired trait into a plant according to claim 1.

17. A method for producing *Angelonia* seed comprising the steps of:
  (a) crossing a plant according to claim 1 with itself or a second plant capable of being crossed thereto; and
  (b) collecting resulting seed.

18. The method of claim 17, further comprising the steps of:
  (c) crossing a plant grown from said seed of step (b) with itself or a different plant at least one additional time to yield additional seed.

19. A method of producing a *Angelonia angustifolia* plant with an amf1-1 allele, said method comprising introgressing into said plant at least a first amf1-1 allele.

20. The method of claim 17, wherein said amf1-1 allele has been inherited from *Angelonia angustifolia* line 370-1 or a progeny or progenitor of any generation thereof comprising said allele, a sample of seed comprising the allele having been deposited under NCMA Accession No. 202107001.

21. An $F_1$ hybrid seed having the plant of claim 1 as one parent.

22. The $F_1$ hybrid seed of claim 21, wherein said plant is a male parent.

23. The $F_1$ hybrid seed of claim 21, wherein said plant is a female parent.

24. A plant produced by growing the seed of claim 21, wherein the plant comprises the amf1-1 allele.

25. A plant part comprising a cell of the plant of claim 24.

26. The plant part of claim 25, further defined as a cutting, leaf, a floret, an ovule, pollen, or a flower.

27. The plant of claim 1, wherein said plant is a triploid plant.

28. The method of claim 19, wherein said introgressing comprises:
  a) crossing the plant of claim 1 with a second *Angelonia angustifolia* plant of a different genotype to produce at least a first progeny plant; and
  b) selecting a progeny plant comprising said at least first amf1-1 allele.

29. The method of claim 28, wherein said selecting comprises detecting a marker locus genetically linked to said amf1-1 allele selected from the group consisting of marker locus SNP 11 having SEQ ID NO: 1, marker locus SNP 27 having SEQ ID NO:4, and marker locus SNP 6 having SEQ ID NO:7.

30. The method of claim 1, wherein said plant comprises marker locus SNP 11 having SEQ ID NO:1.

31. The method of claim 1, wherein said plant comprises marker locus SNP 27 having SEQ ID NO:4.

32. The method of claim 1, wherein said plant comprises marker locus SNP 6 having SEQ ID NO:7.

* * * * *

SEQUENCE LISTING

```
<160> NUMBER OF SEQ ID NOS: 9

<210> SEQ ID NO 1
<211> LENGTH: 75
<212> TYPE: DNA
<213> ORGANISM: Angelonia angustifolia

<400> SEQUENCE: 1
tgaggataag ttgaaacaga agatagcaga agagatcaaa tcatgccact ttacacctac    60
tagtacaatt atgct                                                    75

<210> SEQ ID NO 2
<211> LENGTH: 29
<212> TYPE: DNA
<213> ORGANISM: Artificial Sequence
<220> FEATURE:
<223> OTHER INFORMATION: Forward Primer

<400> SEQUENCE: 2
tgaggataag ttgaaacaga agatagcag                                     29

<210> SEQ ID NO 3
<211> LENGTH: 30
<212> TYPE: DNA
<213> ORGANISM: Artificial Sequence
<220> FEATURE:
<223> OTHER INFORMATION: Reverse Primer

<400> SEQUENCE: 3
agcataattg tactagtagg tgtaaagtgg                                    30

<210> SEQ ID NO 4
<211> LENGTH: 99
<212> TYPE: DNA
<213> ORGANISM: Angelonia angustifolia

<400> SEQUENCE: 4
ggagaaacag aattagaggg taggaaaaag gaaagaaatt aaatataaga ggctttgagg    60
aatatcaagt acttggtgct acttatacaa ttcgagtac                          99
```

```
<210> SEQ ID NO 5
<211> LENGTH: 24
<212> TYPE: DNA
<213> ORGANISM: Artificial Sequence
<220> FEATURE:
<223> OTHER INFORMATION: Forward Primer

<400> SEQUENCE: 5
ggagaaacag aattagaggg tagg                                          24

<210> SEQ ID NO 6
<211> LENGTH: 26
<212> TYPE: DNA
<213> ORGANISM: Artificial Sequence
<220> FEATURE:
<223> OTHER INFORMATION: Reverse Primer

<400> SEQUENCE: 6
gtactcgaat tgtataagta gcacca                                        26

<210> SEQ ID NO 7
<211> LENGTH: 51
<212> TYPE: DNA
<213> ORGANISM: Angelonia angustifolia

<400> SEQUENCE: 7
gtgcctcatg ggccttcctg ctggatatgt atacagtgga cttgggagtc t            51

<210> SEQ ID NO 8
<211> LENGTH: 17
<212> TYPE: DNA
<213> ORGANISM: Artificial sequence
<220> FEATURE:
<223> OTHER INFORMATION: Forward primer

<400> SEQUENCE: 8
gtgcctcatg ggccttc                                                  17

<210> SEQ ID NO 9
<211> LENGTH: 19
<212> TYPE: DNA
<213> ORGANISM: Artificial sequence
<220> FEATURE:
<223> OTHER INFORMATION: Reverse primer

<400> SEQUENCE: 9
agactcccaa gtccactgt                                                19
```